April 28, 1964

MICHELINE CALIS NEE MATROT ETAL  3,131,239

METHOD OF MANUFACTURING POROUS BARRIERS

Filed April 24, 1958

United States Patent Office

3,131,239
Patented Apr. 28, 1964

3,131,239
METHOD OF MANUFACTURING POROUS BARRIERS
Micheline Calis, nee Matrot, Levallois-Perret, and Jean Edouard Charpin and Pierre Plurien, Paris, France, assignors to Commissariat a l'Energie Atomique, Paris, France, a State administration of France
Filed Apr. 24, 1958, Ser. No. 730,673
Claims priority, application France Apr. 26, 1957
7 Claims. (Cl. 264—63)

The present invention relates to methods of manufacturing porous barriers including a very great number of very small pores.

In order to perform the isotopic separation of some gases such for instance as uranium hexafluoride, nitrogen, carbonic acid gas, and the rare gases contained in air, by diffusion through porous barriers, it is necessary to comply with the following conditions:

(a) The radius of the pores must be at most equal to the mean free path of the gaseous molecules;

(b) The number of these pores per unit of area of the barrier must be sufficiently high.

The common methods of sintering of powders made of metal oxides, metals or mixtures of metal oxides and metals do not permit of obtaining pores which are sufficiently fine, numerous and well distributed to ensure such a separation in satisfactory conditions.

The object of the present invention is to permit of obtaining barriers capable of achieving said separation in the best possible conditions.

For this purpose, according to our invention, we mix with an organic binder, preferably a thixotropic one, a powder of a metal oxide and/or a metal, the size of the grains of said powder being of an order of magnitude about twice that of the pores to be obtained in the desired barrier and the paste thus obtained is shaped and sintered in such manner as just to start the welding together of the grains in contact with one another, that is to say under conditions, in particular of temperature, less intensive than in ordinary sintering processes.

The choice of a sintering temperature substantially lower than those used in ordinary sintering processes for the manufacture of ceramics or the metallurgy of powders may be explained by the following considerations.

It may be supposed, as a first approximation, that the grains of the powder are spherical and that in the paste that has been given the desired shape they are chiefly distributed in juxtaposed groups, each constituted by four spheres of equal radius tangent together and the centers of which are located at the apexes of a regular tetrahedron.

During the heating up and after evacuation of the binder, the grains thus distributed are first in punctual contact with one another.

When the temperature rises above a given value which corresponds to the beginning of sintering the thermal agitation of the ions is such that some ions overcome the surface forces, more particularly at the points of contact where, due to the pressure exerted during the shaping of the paste, there has been a local crushing of the matter with a breaking of the crystalline network and therefore a weakening of the surface energy.

When the temperature is some tens of degrees above this value, the ions of two adjoining grains in contact with each other are exchanged and reconstitute a crystalline structure. The two grains have been welded together.

In the method according to the present invention, the temperature and the duration of sintering are chosen experimentally in every case so as to remain in this state.

At high temperatures or at the same temperature but after a longer time, the areas of contact would become greater and the grains would tend to move toward one another. This movement of the grains toward one another would correspond, macroscopically, to a shrinkage. The smallest pores would be contiguous to the contact areas which were initially the greatest, and therefore the most active, during this sintering period. Consequently, the general tendency would be to fill the small pores by toppling of the grains and therefore to increase the dimensions of the biggest pores.

If the sintering operations were pursued, the biggest pores would in turn decrease so as to give rise to a compact block of matter, which is desirable for the obtainment of gastight products but not for that of porous barriers.

This is why the temperature and duration of sintering finally chosen in every case are those which correspond to a practically punctual welding of the grains together without enlargement of some pores or clogging of others.

Thus, whereas in order to obtain gastight ceramics made from alumina the sintering operation is conducted at 1,800° C., in order to obtain porous barriers from alumina according to the invention the sintering operation is conducted at temperatures ranging only from 1,100° to 1,300° C.

After this welding has been obtained, that is to say generally when the suitable sintering temperature has been maintained for a given time period, for instance averaging one hour (this step of the operation being hereinafter called "heating step"), it is sometimes necessary to perform a quick cooling of the sintered product in order to stop the structural modification of its grains in the desired state.

The structure finally obtained in which the grains are merely welded together at their points of contact has been studied in particular by measuring the gaseous diffusion speed.

This study showed that the mean radius of the pores is, in this structure, substantially one half of that of the grains, so that it is possible to determine in advance the radius of the pores by choosing the size of the grains.

Calculation of the radius $r$ of a circle having the same area as the curvilinear triangle limited by three circles of radius $R$ tangent together, as shown by FIG. 1, shows that $r$ is equal to $0.22R$. This difference between this value and the above stated experimental result $0.5R$ may be explained by the fact that this curvilinear triangle constitutes the smallest cross-section of the space through which flows the diffused gas and furthermore by taking into account the influence of the branching conduits constituted by the intervals between the tangent spheres of every tetrahedric group and the spheres adjacent to this group, and also the fact that the tetrahedric structure is accompanied by other structures for instance cubic and octahedric structures.

Of course, the temperature and duration of the heating step which permit of obtaining the suitable structure of assembly of the grains will depend upon the nature and the proportions of the material that are used.

Besides, these sintering conditions may be modified by the choice of the initial reactivity of the grains or of the mixtures of grains that are used. For instance taking into account the fact that gamma alumina is "reactive" (that is to say that it has a tendency to transform itself into alpha alumina by heating at temperatures ranging from 1,100° to 1,200° C.) it is possible by suitable mixing of these two kinds of alumina to influence the sintering conditions for the obtainment of the desired structure.

In a likewise manner, we may mix reactive powders, i.e. powders the structure of which is easily modified by heating (for instance nickel and titanium oxide) with little reactive powders (magnesia and zirconia) in order to modify the sintering conditions.

The binder that is used may be any binder known for sintering, for instance a thixotropic organic binder that is to say one capable of passing from the rigid state to the liquid state under the effect of a mere pressure and to reassume its rigid state as soon as said pressure ceases to be exerted.

Such binders are for instance constituted by a solution of ceresine in terpineol, a polyvinyl alcohol in aqueous solution, gum tragacanth in the form of an aqueous gel, Vaseline, paraffin oil and so on.

During the heating up period, the temperature will be kept at a given value for a sufficient time to permit the slow evacuation of the binder without cracking of the treated pieces.

A preferred embodiment of this invention will be hereinafter described with reference to the accompanying drawings, given merely by way of example and in which.

*Example I*

1,500 gr. of liquid terpineol are mixed with 290 gr. of solid ceresine wax.

This mixture is heated to 80°, at which temperature the ceresine wax melts and dissolves in terpineol to form a homogeneous mixture which will constitute the binder.

The powder to be sintered is constituted by grains of alumina of a radius ranging from 0.02 to 0.04 micron either in the form of gamma alumina or in the form of a mixture of alpha alumina and gamma alumina.

This powder is dried at a temperature ranging from 150 to 200° C.

The binder is poured on this powder, sixty parts by weight of binder for one hundred parts by weight of powder, and the whole is mixed in the hot state in a rotary drum so that the powder and the binder are well mixed together. During the subsequent cooling every grain or bunch of grains of powder is surrounded by a film of gelified binder.

After homogenizing, the paste is extruded to form tubes in the conventional manner.

The extruded porous tubes have an external diameter of the order of 1 centimeter and a thickness of the order of 1 millimeter.

Figure 1:
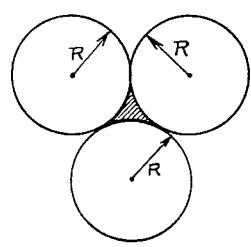
Figure 2:
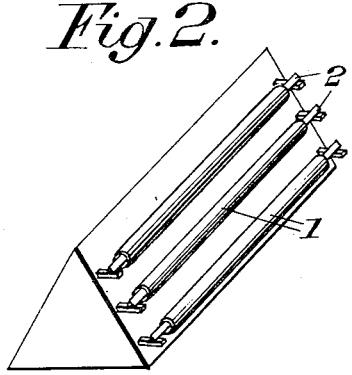
FIG. 2 shows porous tubes during a drying operation which is to take place after their shaping and before their sintering.

They are cut to the desired length, for instance 50 centimeters. Then, the tubular elements 1 are placed on a straight support such as shown at 2 on FIG. 2 and in this position they are dried either in the atmosphere or in a dry oven through which air is caused to pass.

Figure 3:
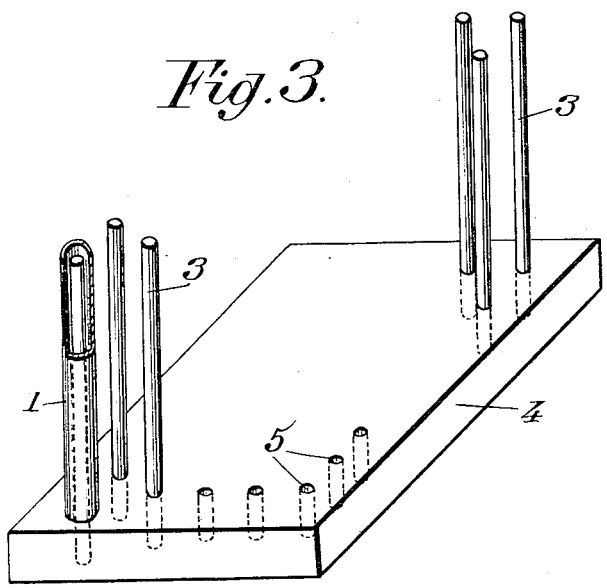
FIG. 3 shows the mounting of these tubes for sintering.
Figure 4:
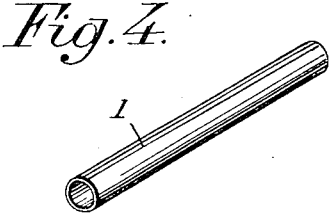
FIG. 4 shows a tube made according to our invention.

After drying, tubes 1 are placed vertically around supports 3 (FIG. 3) made of a refractory ceramic containing a high proportion of alumina, said supports being held by a base 4 of refractory alumina provided with vertical holes 5 the diameter of which is equal to the outer diameter of supports 3.

The whole is placed in an electric furnace where the temperature is the same everywhere with a possible difference of ±10° C., said furnace being preferably constructed in such manner that the heating elements do not radiate directly on the tubes to be sintered. The heating up is conducted at the rate of about 100° per hour, the temperature being left at 250–300° C. for 1 hour in order to enable the binder to be driven off without cracking the tubes. This heating up operation is pursued until a temperature of 1,100° is reached, which temperature is maintanied for 1 hour.

After this, the temperature is suddenly lowered to 400° C.

According to the sintering temperature, porous barriers are obtained in which the mean radius of the pores (measured by diffusion through said barriers of a mixture of equal amounts of nitrogen and carbonic acid gas) ranges from 0.01 to 0.03 micron and the permeability of which, counted in molecule-grams of air per sq. cm. of barrier for a difference of pressure of 1 cm. of mercury, is respectively equal to:

From 90 to $100 \times 10^{-7}$ for a radius of 0.01 micron,
$200 \times 10^{-7}$ for a radius of 0.02 micron,
From 250 to $300 \times 10^{-7}$ for a radius of 0.03 micron.

*Example II*

The process is the same as in Example I but the powder that is treated consists of titanium oxide having the same grain size as the alumina above referred to, the sintering operation being conducted in a highly oxidizing medium at a temperature ranging from 700 to 900° C.

The porous barriers thus obtained have a mean radius of the pores ranging from 0.01 to 0.02 micron and a permeability ranging from 100 to $150 \times 10^{-7}$.

*Example III*

The process is the same as in Example I but the powder consists of magnesia of the same grain size as the alumina above referred to, the sintering operation being conducted in air at a temperature ranging from 1,300 to 1,400° C.

The mean radius of the pores is 0.03 micron and the permeability $200 \times 10^{-7}$.

What we claim is:

1. A method of manufacturing a porous barrier which comprises mixing together into a paste a thixotropic binder and a powder of at least one metal oxide of the group consisting of alumina, titanium oxide and magnesia, the mean radius of the grains of said powder being less than one micron, shaping this paste into a tube the wall thickness of which is approximately 1 millimeter, and heating said element, this heating being conducted in two steps, to wit, a first one at a temperature just sufficient to ensure a slow evacuation of said binder without cracking of the tube, and a second one at a temperature ranging from 700 to 1,400° C. and chosen such as to obtain just a surface joining of the grains in contact with one another.

2. A method according to claim 1 in which the temperature of the first heating step ranges from 250 to 300° C.

3. A method according to claim 1 in which said powder consists of alumina and said second heating step is performed at a temperature of approximately 1,100° C.

4. A method according to claim 1 in which said powder consists of alumina and said second heating step is performed at a temperature of approximately 1,100° C., said temperature being maintained for approximately one hour and then suddenly lowered to 400° C.

5. A method according to claim 1 in which said powder consists of a mixture of alpha alumina and gamma alumina and said second heating step is performed at a temperature of approximately 1,100° C.

6. A method according to claim 1 in which said powder consists of titanium oxide and said second heating step is performed at a temperature ranging from 700 to 900° C.

7. A method according to claim 1 in which said powder consists of magnesia and said second heating step is performed at a temperature ranging from 1,300° to 1,400° C.

References Cited in the file of this patent

UNITED STATES PATENTS

| | | |
|---|---|---|
| 2,157,596 | Davis | May 9, 1939 |
| 2,553,714 | Lucas | May 22, 1951 |
| 2,563,307 | Burnham et al. | Aug. 7, 1951 |
| 2,584,475 | Lecuir | Feb. 5, 1952 |
| 2,593,507 | Wainer | Apr. 22, 1952 |
| 2,593,943 | Wainer | Apr. 22, 1952 |
| 2,698,232 | Golibersuch | Dec. 28, 1954 |